United States Patent [19]  
Sasaki

[11] Patent Number: 4,994,678  
[45] Date of Patent: Feb. 19, 1991

[54] APPARATUS FOR DETECTING A SHEET BY DISPLACEMENT OF A ROLLER

[75] Inventor: Yoshikazu Sasaki, Osaka, Japan

[73] Assignee: Minolta Camera Kabushiki Kaisha, Osaka, Japan

[21] Appl. No.: 328,050

[22] Filed: Mar. 23, 1989

[30] Foreign Application Priority Data

Mar. 24, 1988 [JP] Japan ................................. 63-71463

[51] Int. Cl.⁵ ....................... G01N 21/86; G01V 9/04
[52] U.S. Cl. ................................ 250/560; 250/223 R; 356/381
[58] Field of Search ................... 250/560, 561, 223 R, 250/563, 234–236; 356/237, 230, 429, 381

[56] References Cited

U.S. PATENT DOCUMENTS 3,956,764 5/1976 Schausberger ...................... 250/561  
4,881,086 11/1989 Misawa ............................... 250/561

FOREIGN PATENT DOCUMENTS 58-224938 12/1983 Japan .  
59-57778  4/1984 Japan .  
61-2583   6/1986 Japan .  
61-25283  6/1986 Japan .

Primary Examiner—David C. Nelms  
Assistant Examiner—Stephone B. Allen  
Attorney, Agent, or Firm—Price, Gess & Ubell

[57] ABSTRACT

An apparatus, which detects a position of a transported sheet for controlling the printing position on the sheet, cyclically detecting whether the sheet arrives at a prescribed point or not, and generating a detecting signal when the arrival of the sheet is consecutively detected.

6 Claims, 4 Drawing Sheets

APPARATUS FOR DETECTING A SHEET BY DISPLACEMENT OF A ROLLER

BACKGROUND OF THE INVENTION

1. Field of the Invention

The present invention relates to an apparatus for detecting a transported sheet in, for example, printers, facsimiles, or other devices that print on transported sheets, and more specifically relates to an apparatus for detecting a transported sheet so as to control the printing position on the transported sheet.

2. Description of the Related Art

In printers and like image forming devices, the position of the sheet transported by the transport means must be detected, and the print timing must be controlled on the basis of the detection results so as to print at a specific position on the sheet. Configurations such as that disclosed in Japanese laid Open Pat. application No. 59-57778 are known as sheet position detection apparatus used for the purpose described above. The sheet detection apparatus described in the aforesaid patent application provides a stationary roller disposed in the sheet transport path and a pressure roller for applying pressure to said stationary roller, such that the slight movement of the pressure roller induced each time a sheet passes medially to said pressure and stationary rollers is mechanically amplified by means of an oscillating arm and detected.

On account of the mechanical amplification and detection of the slight movement of the pressure roller by means of an oscillating arm, the aforesaid apparatus requires laborious adjustment of the mechanical apparatus which makes maintaining a high precision difficult, and the apparatus also has the disadvantage of being enlarged in overall size.

Japanese Examined Open Pat. application No. 61-25283, on the other hand, discloses a feed detection apparatus in the sheet transport portion of a paper currency operated machines. The apparatus provides a stationary roller, a movable roller for applying pressure to said stationary roller, a light-emitting portion which projects light rays toward the transporting surface of said movable roller, a photoreceptor portion having a plurality of photoreceptors to receive the light reflected from the transporting surface of the aforesaid movable roller, and a plurality of slits disposed anteriorly to each respective photoreceptor. When a paper sheet passes between the rollers, the movable roller is moved only a distance corresponding to the thickness of said paper sheet, and the direction in which the light reflected from the surface of the movable roller is reflected changes accordingly. The aforesaid plurality of photoreceptors are disposed in positions to receive reflected light when no paper sheet is between the rollers, when one sheet is between the rollers, and when two stacked sheets are transported, and the counting of the transported sheets and detecting of the stacked sheets are accomplished by differentiating which of the photoreceptor receives the reflected light.

Although the apparatus disclosed in the aforesaid Japanese Examined Pat. application No. 61-25283 has a compact design because the movement of the movable roller is detected by the photosensor directly without mechanical amplification by some means, there is a danger of detection errors caused by irregular reflection due to the surface condition of the movable roller or soiling or damage to the surface thereof.

SUMMARY OF THE INVENTION

A main object of the present invention is to provide an improved sheet detection apparatus.

Another object of the invention is to provide a compact, high precision sheet detection apparatus.

A further object of the invention is to provide a readily adjustable sheet detection apparatus.

These and other objects of the invention are accomplished by a sheet detection apparatus comprising: a transport roller set for transporting papersheets gripped therebetween with a standard rotation cycle, said roller set incorporating a stationary roller having a fixed axis and a movable roller that is movable perpendicularly to the axis of the stationary roller and has a reflective portion thereon;

means for inducing the movable roller to contact with the stationary roller;

light-emitting means for projecting light rays toward the reflective portion, light-emission control means for turning on and off said light-emitting means in a cycle that is not an integer multiple of the standard rotation cycle;

photosensor means for receiving the light rays reflected by the reflective portion and converting a quantity of received light into a quantity of electricity;

means connected to the photosensor means for generating detecting signals based on the quantity of electricity output by the photosensor means;

output means for outputting a fixed level signal for a fixed period greater than twice the turning cycle of the light-emitting means in response to the detecting signal generated by said generating means, and for changing the level of the output to a different level when the generating means does not generate said detecting signal for said fixed period.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Embodiments of the present invention are described hereinafter with reference to the accompanying drawings.

Figure 1:
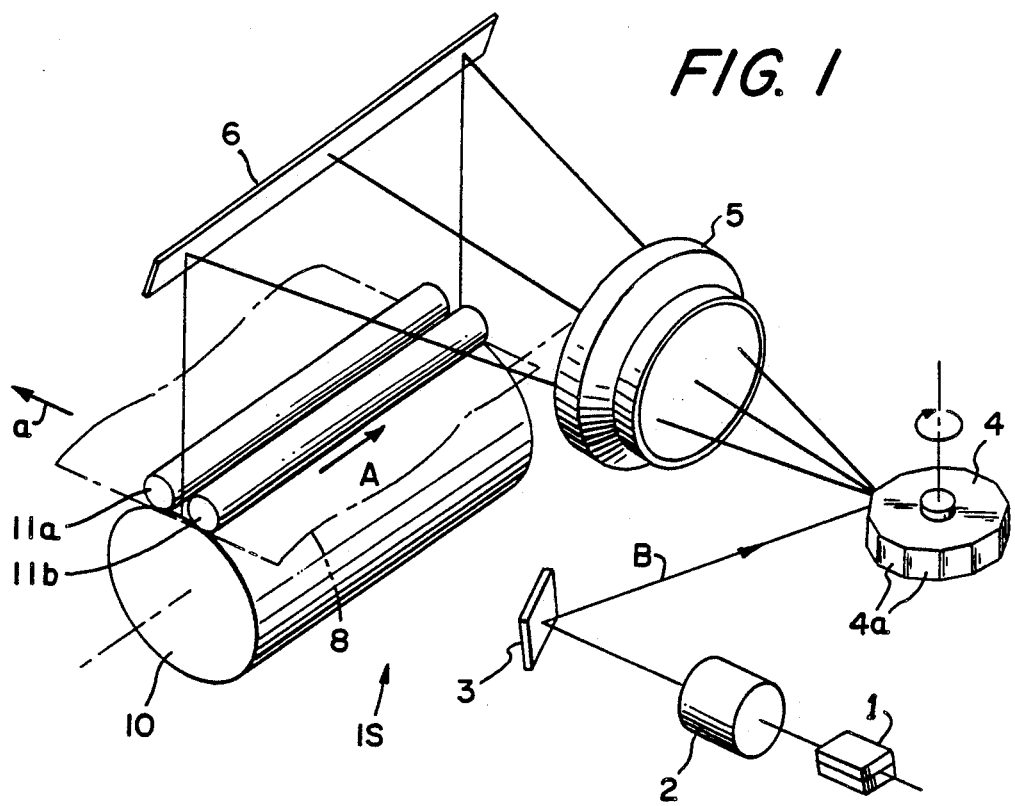
FIG. 1 is a brief schematic view of a laser imager optical system suitable for use in the present invention.

FIG. 1 schematically shows the construction of a laser imager optical system IS which is a single example of a laser scanning type image forming device used in the present invention.

In the drawing, item 1 is a semiconductor laser which generates a laser beam B that is directly modulated by an excitation voltage produced in accordance with image data. After laser beam B is split into parallel rays by collimator lens 2, it is reflected by mirror 3 to reflecting surface 4a of a high-speed rotating polygonal mirror 4.

The angle of inclination of reflecting surface 4a of polygonal mirror 4 changes relative to laser beam B with the rotation of said mirror 4. Laser beam B is reflected by polygonal mirror 4 in accordance with the aforesaid angle of inclination of the reflecting surface thereof, so as to scan the width (direction "A" in the drawing) of a sheet-type silver salt film 8 that is transported in direction "a" in the drawing.

After being reflected by polygonal mirror 4, laser beam B is condensed by fθ lens 5, reflected by mirror 6, and forms an image on the aforesaid film 8.

That is, scanning optical system IS comprises semiconductor laser 1, collimator lens 2, mirror 3, polygonal mirror 4, fθ lens 5, and mirror 6, said optical system IS generating a laser beam B the intensity of which is modulated in accordance with the image data so as to form an image on film 8.

Scanning optical system IS is constructed as a unit or single optical module which is detachable from the body of the laser printer.

Film 8 is gripped between a set of small diameter rollers 11a and 11b and a single large diameter roller 10, and is transported length-wise at uniform speed in direction of arrow "a". Laser beam B generated by the aforesaid optical system IS is reflected between the set of small diameter rollers 11a and 11b, and an image is formed on film 8 by the repeated scans of said laser beam B in conjunction with the transport of the film 8.

Thereafter, film 8 is developed by a developing device not shown in the drawing. The region of the film 8 exposed to the aforesaid laser beam is the image portion and the region which is not exposed is the non-image portion of the output image.

Figure 2:
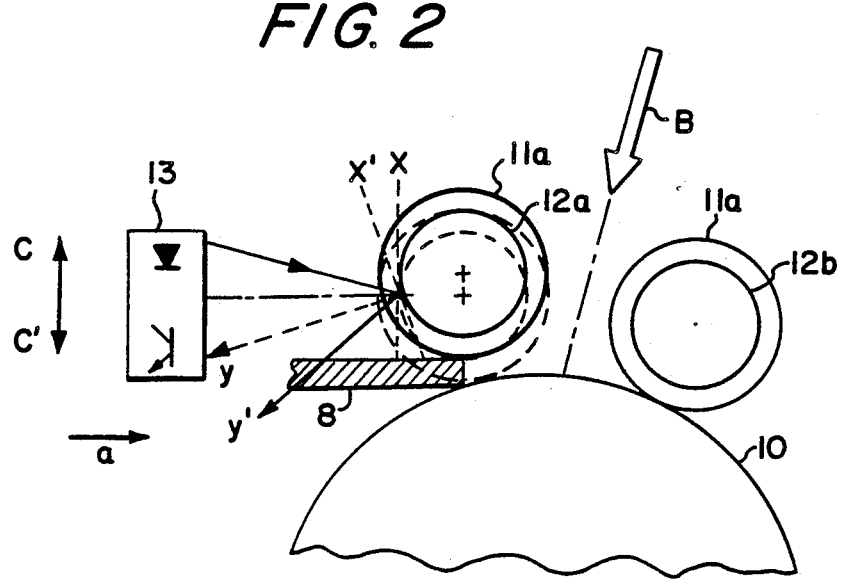
FIG. 2 is a section view of the essential portion of the sheet detection apparatus of the present invention.
Figure 3:
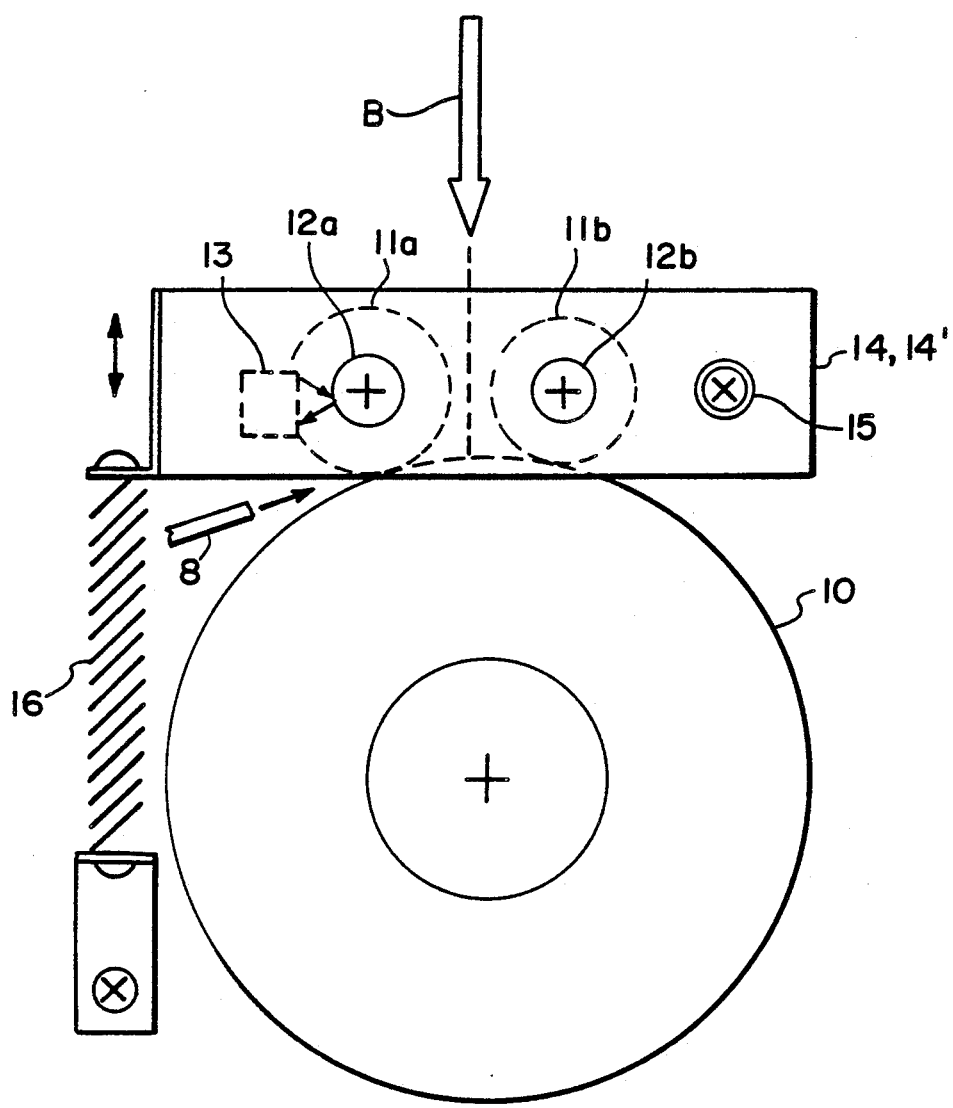
FIG. 3 is a side elevation view of the sheet detection apparatus.

The sheet detection apparatus of the present invention is hereinafter described with reference to FIGS. 2 and 3. Small diameter rollers 11a and 11b are rotatably supported by a pair of roller support panels 14 which have seated thereto the metal shafts 12a and 12b which are provided at both ends of said small diameter rollers 11a and 11b. The pair of roller support panels 14 are pushed toward large diameter roller 10 by means of a spring 16 with shaft 15 acting as a support point. Accordingly, small diameter rollers 11a and 11b press against large diameter roller 10. At the position opposite to the small diameter roller core 12a on the upstream side of the film 8 transport direction, a reflecting-type photosensor 13 comprising a light-emitting diode and phototransistor is fixedly disposed, so as to be adjustable in the directions of arrows C and C'.

The operation of the sheet detection apparatus of the present invention is hereinafter described. As indicated by the dotted line in FIG. 2, the small diameter roller 11a is pressed against the large diameter roller 10 by means of spring 16. Light generated by the light-emitting diode of sensor 13 is projected onto reflective surface X formed on the metal core 12a of the small diameter roller. The light reflected by the aforesaid reflective surface X is projected to the phototransistor of sensor 13 through path Y. The position of photosensor 13 is adjusted to maximize the amount of light received by the phototransistor.

In order to form images in the manner described above, sheet medium 8 is transported between small diameter roller 11a and large diameter roller 10 in the direction of arrow "a". Sheet medium 8 raises small diameter roller 11a against the force applied by spring 16, as indicated by the solid line shown in FIG. 2. The path traveled by the light emitted by the light-emitting diode of photosensor 13 is converted from Y to Y' in correlation with the modification of the reflective surface of small diameter roller 11a from X to X'. The quantity of light received by the phototransistor is reduced because the center of the light reflected by reflective surface X' is dislocated from the phototransistor of sensor 13.

The output from the phototransistor is transmitted to a detection circuit mentioned later, and the arrival of the leading edge of the aforesaid sheet medium 8 at the small diameter roller 11a is detected by the change in the output signal of the aforesaid phototransistor. The detection results are transmitted to a control circuit (not shown in the drawings) to control the timing of the start of laser exposure based on the aforesaid signals.

Figure 4:
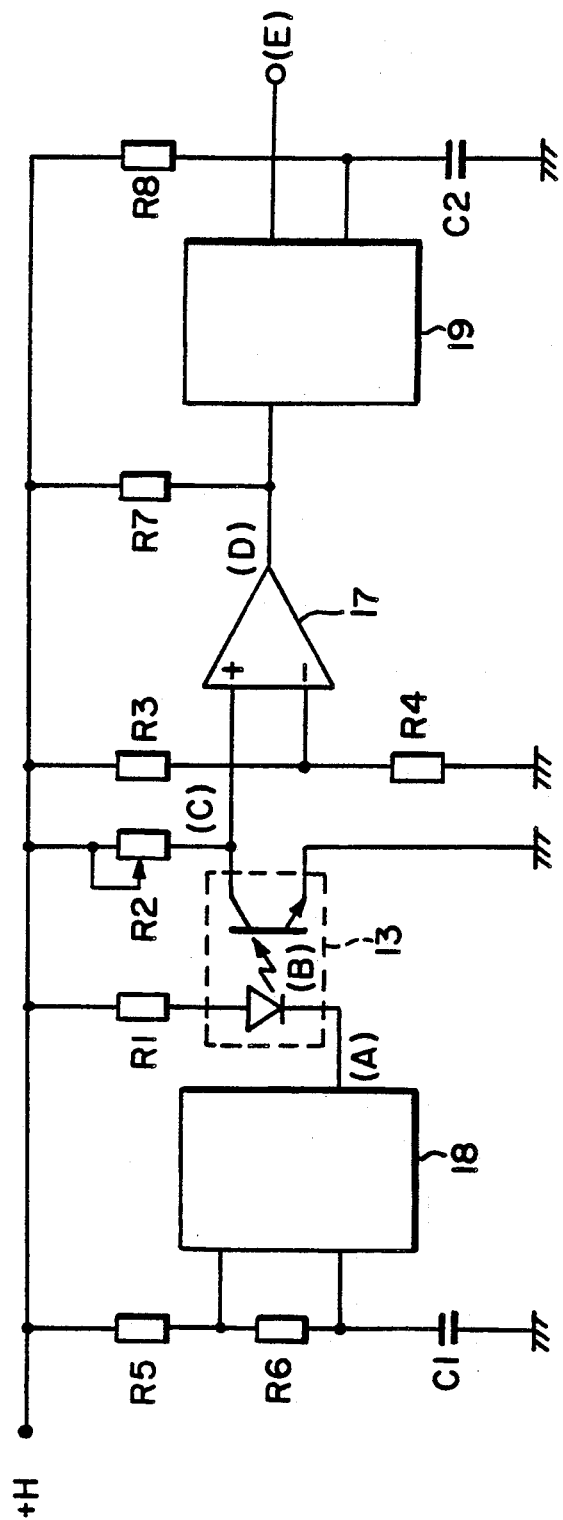
FIG. 4 is a circuit diagram showing the detection circuit of the sheet detection apparatus.

FIG. 4 shows the detection circuit including photosensor 13.

Resistor R1 is connected to the light-emitting diode and determines how much light is emitted. Resistor R2 is connected to the phototransistor and determines phototransistor sensitivity. The phototransistor and resistors R3 and R4 are connected to comparator 17; the output of the phototransistor is compared to the threshold values of resistors R3 and R4 and converted into either high or low signals.

An oscilltor 18 comprising an astable multivibrator is provided in the fore portion of sensor 13 as a means for intermittently interrupting the light emission of the light-emitting diode. Resistors R5 and R6 and condenser C1 are connected to oscillator 18 and determine the oscillation frequency of said oscillator. An output maintenance circuit 19 comprising a monostable multivibrator is provided in the after portion of comparator 17. Resistor R8 and condenser C2 are connected to the output maintenance circuit 19 and determine the maintenance period of the output level.

Figure 5:
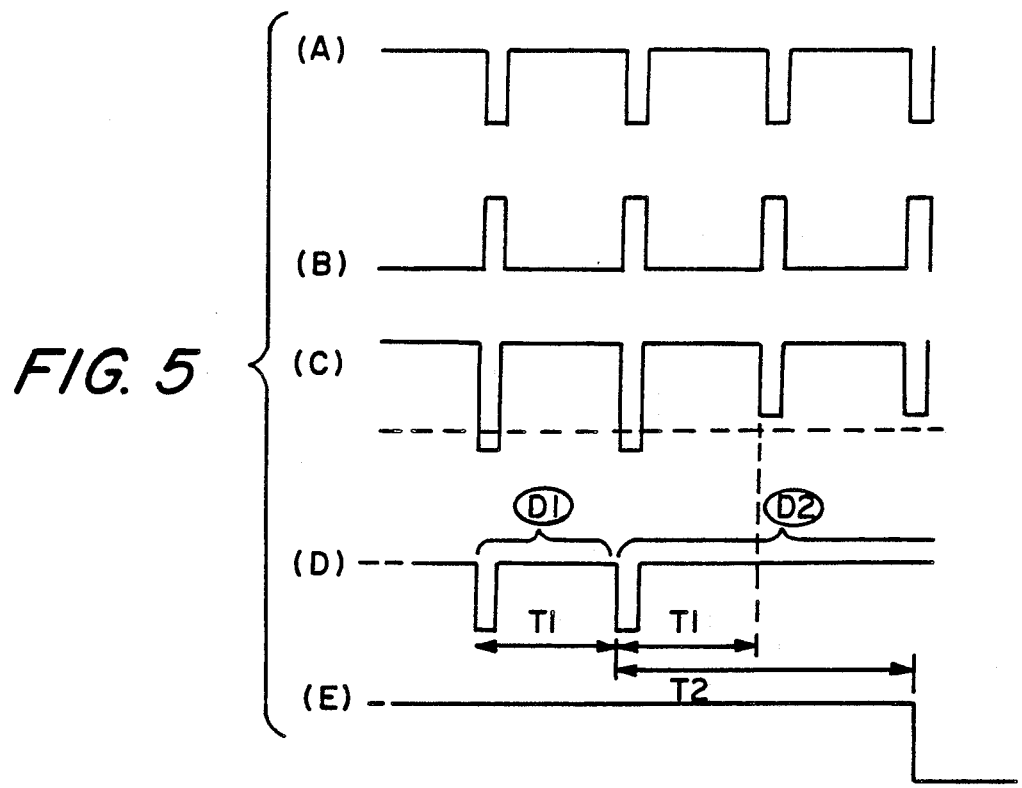
FIG. 5 is an illustration showing the output waveforms for each portion of the detection circuit.

Details of operation are described hereinafter using each output waveform of the sheet detection circuit, as shown in (A) portion of FIG. 5. The output waveform of oscillator 18 is shown in FIG. 5; the high level period is determined by resistor R5 and low level period is determined by resistor R6. The percentage of time that light is emitted by the light-emitting diode (hereinafter referred to as illumination rate) is desirably 50% or less so as to avoid detection of irregular reflection noise from the metal core 12a of the small diameter roller. (B) portion of FIG. 5 shows the output waveform of the light-emitting diode connected to oscillator 18. The arrangement of photosensor 13 is as described in FIGS. 2 and 3. The output waveform of sensor 13 (phototransistor) changes as shown in (C) portion of FIG. 5 in accordance with the detection of the sheet medium. Comparator 17 compares the signal transmitted from sensor 13 with the threshold values set by resistors R3 and R4. (D) portion of FIG. 5 shows the output waveform of comparator 17. (E) portion of FIG. 5 shows the output waveform of output maintenance circuit 19 which is connected to the output side of comparator 17. The operation of the output maintenance circuit is hereinafter described. The output of output maintenance circuit 19 becomes high level at the low level starting point of the pulse-wave shown in (D) portion of FIG. 5, and can maintain said high level only for a time constant T2 determined by condenser C2 and resistor R8. Accordingly, output E is maintained at high level in D1 (FIG. 5) because a subsequent input pulse will occur before time T2 elapses. The time constant T2 is set so as to be greater than period T1 of oscillator 18. Since there is not a subsequent low level input pulse even after time T2 elapses in D2 (FIG. 5D), Output E is changed to low level after time T2 has elapsed. Detection of the leading edge of the sheet medium is accomplished by the aforesaid output change from high to low level.

The pulse monitoring time T2 is determined by the permissible error in leading edge detection as specified by secondary scanning speed, diameter and rotation period of each roller. The requirements for precision sheet leading edge detection are satisfied in the present embodiment if time T2 is 20 ms or less. Although the intermittent illumination period is likewise 20 ms or less (50 Hz or greater) based on time T2 permissible values, it is set at 100 Hz or greater. Detection error of output E does not occur even if a single pulse in FIG. 5D is missed due to surface conditions of the metal core 12$a$ of the small diameter roller since time T2 is greater than a double of T1.

To prevent detection errors due to synchronization of the detection pulse with soiling or damage on the surface of the small diameter roller 11$a$ or metal core 12$a$, the oscillation cycle of oscillator 18 is set so as to avoid integer multiples of the rotation period of the small diameter roller. In the present embodiment, oscillation frequency is set at 100 Hz (T1=5 ms), illumination rate is 25%, and pulse monitoring time T2 is set at 10 ms because the period of the small diameter rollers is 1.1 to 1.4 Hz.

Figure 6:
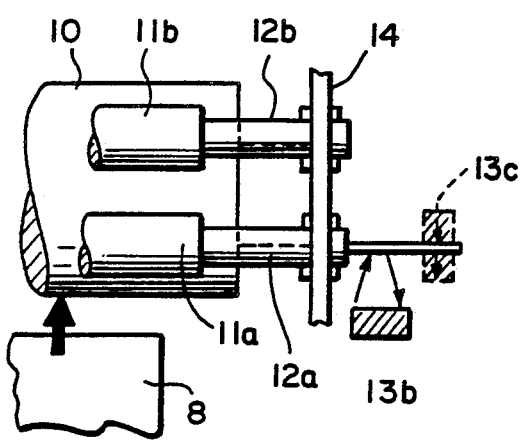
FIG. 6 is a top plan view of another embodiment of the present invention.
Figure 7:
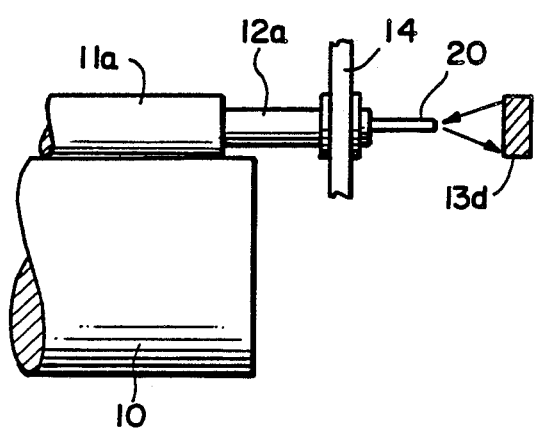
FIG. 7 is a front elevation view of still another embodiment of the invention.

Although the sheet detection apparatus is shown having the reflection-type photosensor 13$a$ mounted opposite metal core 12$a$ of small diameter roller, the smaller the reflecting surface area opposite sensor 13, the greater is the difference in the amount of light received by said sensor and the detection precision therefore increases. FIGS. 6 and 7 show another embodiment of the present invention wherein a sheet detection apparatus is provided opposite a leading edge detection pin having a 1 mm diameter mounted to metal core 12$a$ of the small diameter roller. FIGS. 6 and 7 show sensors 13$b$ and 13$c$ arranged directly across from the rotating shaft of leading edge detection pin 20, and sensor 13$d$ mounted opposite the end of said rotating shaft of detection pin 20. The reflection-type photosensor 13 in each of the embodiments is not disposed in the transport path to avoid exerting adverse influences on image formation even when the sheet medium is, for example, a photosensitive type.

According to the present invention, the sheet detection apparatus can readily receive fine adjustment because the threshold value of comparator 17 is adjustable by changing the resistance values of resistors R3 and R4.

Although the sheet detection apparatus is shown detecting the leading edge of the sheet medium, said apparatus can be employed as a sheet stacking detector by changing the threshold value of comparator 17 so as to switch the output to low level only when the small diameter roller is moved through the thickness of two sheets.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for detecting a sheet comprising:
   a transport roller set for transporting paper sheets gripped therebetween with a standard rotation cycle, said roller set incorporating a stationary roller having a fixed axis and a movable roller that is movable perpendicularly to the axis of the stationary roller and has a reflective portion thereon;
   means for inducing the movable roller to contact with the stationary roller;
   light-emitting means for projecting light rays toward the reflective portion;
   light-emission control means for turning on and off said light-emitting means in a cycle that is not an integer multiple of the standard rotation cycle;
   photosensor means for receiving the light rays reflected by the reflective portion and converting the quantity of received light into a quantity of electricity;
   means connected to the photosensor means for generating detecting signals based on the quantity of electricity output by the photosensor means,
   output means for outputting a fixed level signal for a fixed period greater than twice the turning cycle of the light-emitting means in response to the detecting signal generated by said generating means, and for changing the level of the output to a different level when the generating means does not generate said detecting signal for said fixed period.

2. An apparatus as claimed in claim 1, wherein said output means comprises a monostable multivibrator.

3. An apparatus as claimed in claim 1, wherein said generating means comprises a comparater means for comparing the quantity of electricity output by the photosensor means with a fixed reference value and for producing signals according to the comparison results.

4. An apparatus for detecting a sheet along a sheet transportation system defining a sheet transport path comprising:
   a rotatable member rotating in a first cycle period, said rotatable member being positioned along said sheet transport path and mounted to be movable perpendicular to an axis of rotation of said rotatable member when a sheet is transported along said sheet transport path;
   detecting means for detecting movement of said rotatable member, perpendicular to its axis of rotation, in a second cycle period which is a non-integer multiple of said first cycle period, said detecting means including light-emitting means for projecting light rays toward said rotatable member and a photosensor for receiving said light rays reflected by said rotatable member; and
   output means for outputting a sheet detection signal in response to said detecting means when the movement of the rotatable member is detected at least twice in a consecutive manner.

5. An apparatus as claimed in claim 4, wherein said rotatable member is a roller for conveying the sheet along said sheet transport path.

6. An apparatus as claimed in claim 5, wherein said roller has an axle member whose diameter is smaller than said roller's and said photosensor receives said light rays which are projected from said light-emitting means and are reflected by said axle member.

* * * * *